United States Patent
Mineo et al.

(10) Patent No.: US 8,854,390 B2
(45) Date of Patent: Oct. 7, 2014

(54) INFORMATION PROCESSING APPARATUS, INFORMATION PROCESSING METHOD, COMPUTER PROGRAM, AND INFORMATION PROCESSING SYSTEM

(75) Inventors: Yoshiyuki Mineo, Kanagawa (JP); Koji Ihara, Chiba (JP); Tomohiko Hishinuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 831 days.

(21) Appl. No.: 13/048,213

(22) Filed: Mar. 15, 2011

(65) Prior Publication Data

US 2011/0292061 A1    Dec. 1, 2011

(30) Foreign Application Priority Data

May 31, 2010    (JP) ................. 2010-124166

(51) Int. Cl.
- *G09G 5/00* (2006.01)
- *G06F 3/14* (2006.01)
- *G06F 3/0489* (2013.01)
- *H04N 5/58* (2006.01)

(52) U.S. Cl.
CPC ........ *G06F 3/04897* (2013.01); *G09G 2340/14* (2013.01); *G06F 3/14* (2013.01); *G09G 5/00* (2013.01); *G09G 2320/0666* (2013.01); *G09G 2370/027* (2013.01); *G09G 2370/022* (2013.01); *G09G 2360/144* (2013.01); *G09G 2320/066* (2013.01); *H04N 5/58* (2013.01)
USPC ......................................................... 345/581

(58) Field of Classification Search
None
See application file for complete search history.

(56) References Cited

U.S. PATENT DOCUMENTS

| | | | | |
|---|---|---|---|---|
| 8,356,071 | B2 * | 1/2013 | Schmier ........................ | 709/203 |
| 8,519,907 | B2 * | 8/2013 | Toya .............................. | 345/3.4 |
| 2009/0085922 | A1 * | 4/2009 | Harris et al. .................. | 345/556 |
| 2009/0156970 | A1 * | 6/2009 | Sullivan .......................... | 601/37 |
| 2009/0251460 | A1 * | 10/2009 | Dunnigan ..................... | 345/419 |
| 2009/0262063 | A1 | 10/2009 | Fujine et al. | |
| 2011/0175925 | A1 * | 7/2011 | Kane et al. .................... | 345/589 |

FOREIGN PATENT DOCUMENTS

JP    2007-241236    9/2007

* cited by examiner

*Primary Examiner* — Phi Hoang
*Assistant Examiner* — Mohammad H Akhavannik
(74) *Attorney, Agent, or Firm* — Oblon, Spivak, McClelland, Maier & Neustadt, L.L.P.

(57) ABSTRACT

There is provided an information processing apparatus including a setting information changing unit adapted to change setting information for setting a presentation state of a content on the basis of viewing environment information representing an environment in which the content is to be viewed and presentation state changing information for changing the presentation state of the content in accordance with the environment in which the content is to be viewed, and a content presentation unit adapted to present, on the basis of the setting information, the content to a user via a display device.

16 Claims, 5 Drawing Sheets

INFORMATION PROCESSING APPARATUS, INFORMATION PROCESSING METHOD, COMPUTER PROGRAM, AND INFORMATION PROCESSING SYSTEM

BACKGROUND OF THE INVENTION

1. Field of the Invention

The present invention relates to an information processing apparatus, an information processing method, a computer program, and an information processing system.

2. Description of the Related Art

The way in which an image or video looks on a display device varies with the brightness, color temperature, and the like of the viewing environment. Therefore, there has been performed a process of correcting an image or video with a display device in accordance with the viewing environment so that the image or video can be displayed more accurately or finely. For example, JP 2007-241236A discloses a display device that can realize appropriate image display luminance in accordance with a video feature quantity and the surrounding brightness.

SUMMARY OF THE INVENTION

However, while the conventional display devices are adapted to perform correction of an image or the like uniformly to the whole screen as disclosed in JP 2007-241236A or the like, it has been impossible to change a content displayed as an image. Further, it has also been impossible for a provider of a content such as an image or video to inform a user of an optimum viewing environment for viewing the content on the basis of his current viewing environment.

Further, a display device, which cannot acquire information on the viewing environment, is not able to set the presentation state of a content by utilizing such information on the viewing environment. Meanwhile, a display device, which can acquire information on the viewing environment but does not have a function of correcting images or the like, is not able to set the presentation state of a content by utilizing such information.

In light of the foregoing, it is desirable to provide a novel and improved information processing apparatus, information processing method, computer program, and information processing system, which can present a content in a condition suitable for viewing the content, in accordance with the viewing environment.

According to an embodiment of the present invention, there is provided an information processing apparatus including a setting information changing unit adapted to change setting information for setting a presentation state of a content on the basis of viewing environment information representing an environment in which the content is to be viewed and presentation state changing information for changing the presentation state of the content in accordance with the environment in which the content is to be viewed, and a content presentation unit adapted to present, on the basis of the setting information, the content to a user via a display device.

The presentation state changing information may be at least one of content changing information defined by a creator of the content, user's changing information defined by a user of the content, and embedded changing information defined in advance by the information processing apparatus. The setting information changing unit may change the setting information using at least one of the presentation state changing information.

The presentation state changing information may be a changing condition for correcting a color shade of the content to be presented on the display device in accordance with the environment in which the content is to be viewed. The setting information changing unit may, on the basis of the viewing environment information and the presentation state changing information, define in the setting information a color shade of the content that is suitable for the environment in which the content is to be viewed.

The presentation state changing information may be a changing condition for correcting a text size of the content to be presented on the display device in accordance with the environment in which the content is to be viewed. The setting information changing unit may, on the basis of the viewing environment information and the presentation state changing information, define in the setting information a text size of the content that is suitable for the environment in which the content is to be viewed.

The presentation state changing information may be a changing condition for changing the environment in which the content is to be viewed in accordance with the environment in which the content is to be viewed. The setting information changing unit may, on the basis of the viewing environment information and the presentation state changing information, send information about a setting of the viewing environment that is suitable for viewing the content, to the user or an external device that is communicably connected to the information processing device.

The information processing apparatus may further include a viewing environment information acquisition unit adapted to acquire viewing environment information.

The information processing apparatus may further include a communication unit adapted to communicate with an external device, the external device being communicably connected to the information processing apparatus and including a viewing environment information acquisition unit adapted to acquire viewing environment information. The communication unit may acquire the viewing environment information from the external device.

According to another embodiment of the present invention, there is provided an information processing apparatus including a communication unit adapted to communicate with a client device that presents a content to a user via a display device, a content storage unit adapted to store a content, and a setting information changing unit adapted to change setting information for setting a presentation state of the content on the basis of viewing environment information representing an environment in which the content is to be viewed and presentation state changing information for changing the presentation state of the content in accordance with the environment in which the content is to be viewed. The setting information changing unit may, on the basis of the viewing environment information received from the client device via the communication unit, changes the setting information of a content requested to be distributed by the client device. The content requested to be distributed and the changed setting information may be transmitted to the client device via the communication unit.

According to still another embodiment of the present invention, there is provided an information processing method including the steps of changing, with a setting information changing unit, setting information for setting a presentation state of a content on the basis of viewing environment information representing an environment in which the content is to be viewed and presentation state changing information for changing the presentation state of the content in accordance with the environment in which the content is to be viewed, and presenting, with a content presentation unit, the content to a user via a display device on the basis of the setting information.

According to yet another embodiment of the present invention, there is provided an information processing method including the steps of receiving, via a communication unit, a content distribution request and viewing environment information from a client device that presents a content to a user via a display device, changing, on the basis of the viewing environment information and presentation state changing information for changing a presentation state of the content in accordance with the environment in which the content is to be viewed, setting information for setting a presentation state of the content requested to be distributed by the client device, and transmitting the content requested to be distributed and the changed setting information to the client device via the communication unit.

According to further another embodiment of the present invention, there is provided a computer program adapted to function as an information processing apparatus, the program comprising a setting information changing unit adapted to change setting information for setting a presentation state of a content on the basis of viewing environment information representing an environment in which the content is to be viewed and presentation state changing information for changing the presentation state of the content in accordance with the environment in which the content is to be viewed, and a content presentation unit adapted to present, on the basis of the setting information, the content to a user via a display device.

According to further another embodiment of the present invention, there is provided a computer program adapted to function as an information processing apparatus, the program comprising a communication unit adapted to communicate with a client device that presents a content to a user via a display device, and a setting information changing unit adapted to change setting information for setting a presentation state of a content on the basis of viewing environment information representing an environment in which the content is to be viewed and presentation state changing information for changing the presentation state of the content in accordance with the environment in which the content is to be viewed. The setting information changing unit may, on the basis of the viewing environment information received from the client device via the communication unit, changes setting information of a content requested to be distributed by the client device. The setting information changing unit may transmit the content requested to be distributed and the changed setting information to the client device via the communication unit.

The program is stored in a storage device of a computer. Once the program is read by a CPU of the computer and executed, the program can cause the computer to function as the aforementioned information processing apparatus. In addition, a computer-readable recording medium having the program recorded thereon is also provided. Examples of such recording medium include magnetic disks, optical discs, and MO (magneto-optical) disks. Examples of magnetic disks include hard disks and disk-shaped magnetic bodies. Examples of optical discs include CD (Compact Disc), DVD-R (Digital Versatile Disc Recordable), and BD (Blu-Ray Disc (Registered Trademark).

According to further another embodiment of the present invention, there is provided an information processing system including a content distribution server connected over a network and adapted to distribute a content, and a client device adapted to present a content to a user. The content distribution server may include a server communication unit adapted to communicate with the client device, a content storage unit adapted to store a content, and a setting information changing unit adapted to change setting information for setting a presentation state of a content on the basis of viewing environment information representing an environment in which the content is to be viewed and presentation state changing information for changing the presentation state of the content in accordance with the environment in which the content is to be viewed. The client device may include a client communication unit adapted to communicate with the content distribution server, and a content presentation unit adapted to present, on the basis of the setting information, the content to the user via a display device. The client device may transmit a content distribution request and the viewing environment information to the content distribution server via the client communication unit. The content distribution server may change, with the setting information changing unit, the setting information for setting the presentation state of the content that has been requested to be distributed by the client device, on the basis of the viewing environment information and the presentation state changing information for changing the presentation state of the content in accordance with the environment in which the content is to be viewed, and then may transmit the content requested to be distributed and the changed setting information to the client device via the server communication unit. The client device may present, with the content presentation unit, the content on the basis of the received setting information.

As described above, the present invention can provide an information processing apparatus, an information processing method, a computer program, and an information processing system, which can present a content in a condition suitable for viewing the content, in accordance with the viewing environment.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.

1. First Embodiment (a case in which style information is corrected on a client device side.)

2. Second Embodiment (a case in which style information is corrected on a Web server side.)
3. Exemplary Hardware Configuration <1. First Embodiment>

[Overview of the Information Processing System]

Figure 1:
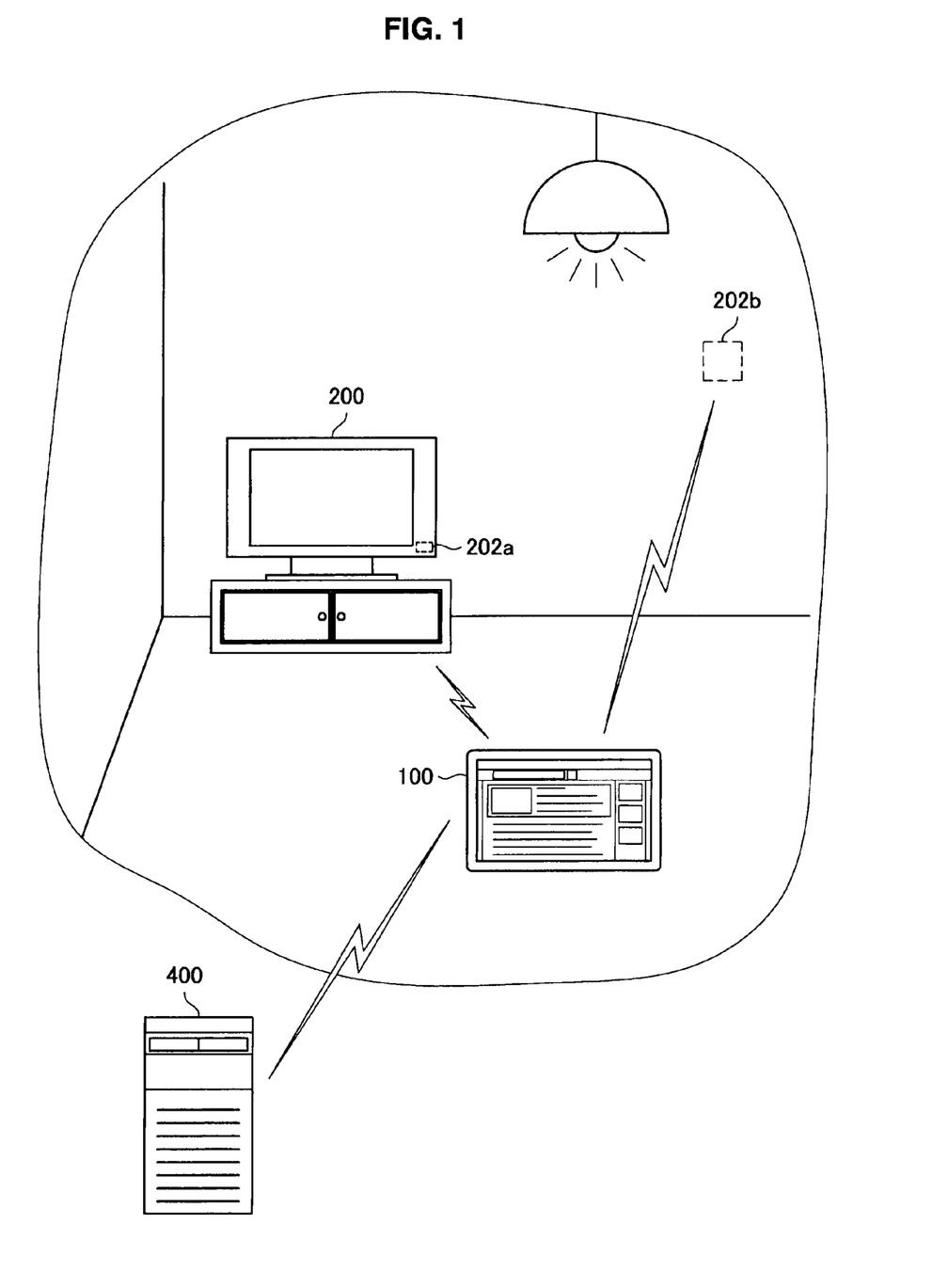
FIG. 1 is an explanatory diagram illustrating an overview of an information processing system in accordance with a first embodiment of the present invention.

First, an overview of an information processing system in accordance with the first embodiment of the present invention will be described with reference to FIG. 1. FIG. 1 is an explanatory diagram illustrating an overview of the information processing system in accordance with this embodiment.

The information processing system in accordance with this embodiment is a system adapted to change the presentation state of a content in accordance with an environment in which the content is to be viewed (in this specification, the term "view" or "viewing" refers to both "watching" and "listening to") so that a user can view the content in an appropriate condition. The "content" herein refers to information provided by a multimedia environment, such as an image, video, or text. As shown in FIG. 1, for example, the information processing system includes a client device 100 adapted to present a content to a user, and an external device connected to the client device 100 over a network to provide information on the viewing environment (hereinafter, such information shall also be referred to as "viewing environment information").

The client device 100 is, for example, a personal computer, a mobile terminal, or the like, and has a browser adapted to analyze and render a content, and a display device adapted to teach a result of the rendering. A content provided by the client device 100 may be stored in the client device 100 in advance, or may be received from an external Web server (a content distribution server) 400, which has contents stored in its storage unit, via a network. The client device 100 in accordance with this embodiment is adapted to, when presenting a content to a user, change the setting information for setting the presentation state of the content on the basis of the viewing environment information that represents the environment in which the content is to be viewed, whereby the content can be appropriately provided to the user.

The "viewing environment information" herein refers to information representing the conditions of environmental factors that could influence the viewing of a content, such as the brightness, color temperature, or sound of the viewing environment. The brightness, color temperature, sound, or the like of the viewing environment is represented by, for example, being converted into a numerical value. The client device 100 can acquire the viewing environment information using a viewing environment information acquisition sensor (denoted by reference numeral 116 in FIG. 2) provided in the client device 100.

When the client device 100 is not provided with such a viewing environment information acquisition sensor, the client device 100 may acquire viewing environment information from an external device, which can acquire viewing environment information in the space in which the client device 100 exists, via a network. As examples of the external device, the following are conceived: a television set 200 that is provided in the same room as the client device 100 and has a sensor 202*a* capable of acquiring viewing environment information, and a room wall that has a sensor 202*b* capable of acquiring viewing environment information. In such a case, the client device 100 can determine the presentation state of a content upon acquiring the viewing environment information from the sensor 202 (202*a* or 202*b*) of the external device.

For example, the client device 100 changes the contrast between the text and background of a content by correcting the text color and background color of the content in accordance with the brightness of the viewing environment so that the text can be clearly seen. Alternatively, the client device 100 may apply a color temperature correction filter to the entire content or to each image included in the content depending on the color temperature of the viewing environment. As described above, the way in which a content is displayed is changed by changing the setting information for setting the presentation state of the content on the basis of the viewing environment information so that the content can be appropriately provided to a user.

Further, the client device 100 can also provide a user with information, warning, or the like about an environment that is suitable for viewing a content. For example, when a user is about to view a content, which includes a moving image with a strong light stimulus, and the viewing environment is determined to be dark, the client device 100 informs the user that the lighting level of the room should be increased to lessen the light stimulus. Meanwhile, when a user is about to view a content such as a horror movie and the viewing environment is bright, the client device 100 recommends the user to view the content in a dimly lit room so that the realism of moving images can be increased.

Further, the client device 100 can also inform an external device, which is communicably connected to the client device 100, of an environment that is suitable for viewing a content and the like. For example, if information about the brightness or color temperature that is suitable for viewing a content is sent to a lighting fixture, which can communicate with the client device 100, it becomes possible to automatically change the brightness or color temperature of the lighting fixture. Alternatively, it is also possible to, in addition to sending the aforementioned information to the external device, ask a user if it is permitted to change the brightness or color temperature of the lighting fixture, and if the user has permitted the change, automatically change the brightness or color temperature with the lighting fixture to a level that is suitable for viewing the content.

In the information processing system in accordance with this embodiment, setting information for setting the presentation state of a content can be set by a user, a creator of the content, or the like. Thus, it is possible to let a user view a content in a viewing environment that suits the taste of the user. Further, it is also possible to let a user view a content in a viewing environment that is intended by a creator of the content. As described above, the client device 100 can present a content while reflecting the intention of a user or a creator of the content, not by uniformly changing the display state with a display device as is conventionally done. Further, it is also possible to change the setting other than the setting of the viewing environment, such as the font or background color of a content, in accordance with the intention of a creator of the content or the taste of a user.

Hereinafter, the configuration and function of the client device 100 in accordance with this embodiment will be described in detail.

[Configuration of the Client Device]

Figure 2:
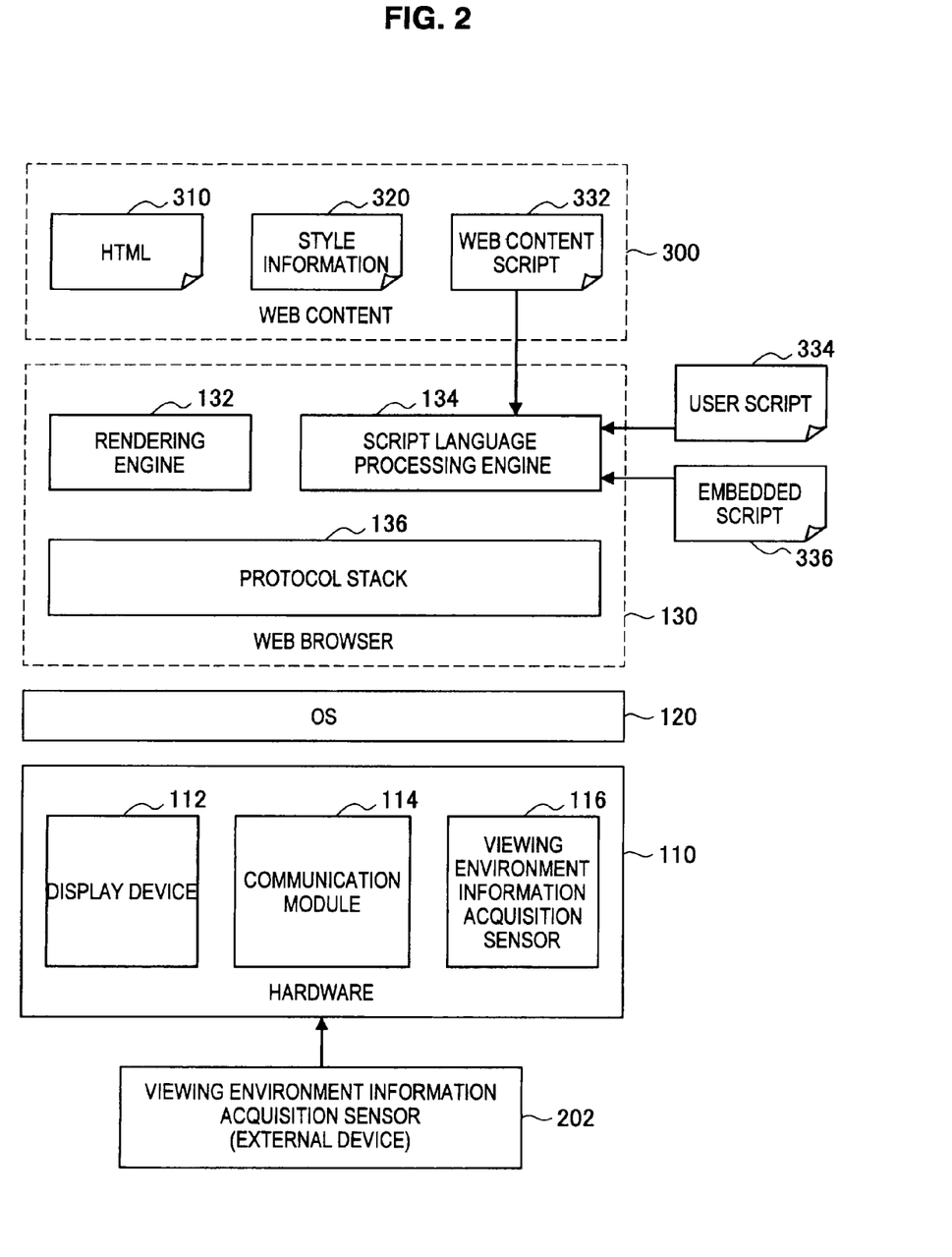
FIG. 2 is an explanatory diagram showing the configuration of a client device in accordance with the embodiment.

First, the configuration of the client device 100 in accordance with this embodiment will be described with reference to FIG. 2. FIG. 2 is an explanatory diagram showing the configuration of the client device 100 in accordance with this embodiment.

As shown in FIG. 2, the client device 100 in accordance with this embodiment includes hardware 110, an OS 120, and a Web browser 130 that is software adapted to perform a process for presenting a content. FIG. 2 only describes processes that are necessary to present a content with the client device 100. However, in practice, the client device 100 may also include hardware and software for implementing other functions.

(Hardware 100)

The client device 100 includes as the hardware 100 a display device 112, a communication module 114, a viewing environment information acquisition sensor 116, and the like, for example. The display device 112 is a device adapted to display a content that has been subjected to a rendering process by the Web browser 130. The display device 112 can be, for example, a liquid crystal display, an organic EL display, or the like. The communication module 114 is an interface unit adapted to communicate with external devices or servers. The communication module 114 communicates with, for example, the viewing environment information acquisition sensor 202 provided in an external device to acquire viewing environment information. In addition, the communication module 114 can also communicate with a Web server connected thereto over a network and receive a content or the like.

The viewing environment information acquisition sensor 116 acquires viewing environment information representing a viewing environment in which a content is to be viewed. Specifically, the viewing environment information acquisition sensor 116 detects and acquires the condition of a viewing environment in which the client device 100 exists, that is, a viewing environment in which a user is about to view a content, and outputs the acquired condition as the viewing environment information to the Web browser 130. Examples of the viewing environment information acquired by the viewing environment information acquisition sensor 116 include the brightness, color temperature, and sound of the viewing environment, as described above. Such viewing environment information is used to change the setting information for setting the presentation state of the content. Although the client device 100 in this embodiment is provided with the viewing environment information acquisition sensor 116, this sensor need not necessarily be provided. In that case, the client device 100 acquires viewing environment information, which has been acquired by the viewing environment information acquisition sensor 202 of an external device, using the communication module 114, and outputs the viewing environment information to the Web browser 130.

(OS 120)

The Os (Operating System) 120 is Software that Controls the Client Device 100 and allows the use of computer resources through an application or the like. With the OS 120, management of the hardware 110 is conducted and software such as the Web browser 130 can be operated.

(Web Browser 130)

The Web browser 130 is software that performs a content rendering process and interacts with a user. The Web browser 130 in accordance with this embodiment performs a process for displaying a content in a condition suitable for the viewing environment on the basis of the viewing environment information. Hereinafter, a process for displaying a Web content 300 with the Web browser 130 will be described as an exemplary process performed by the Web browser 130.

Herein, the Web content 300 is a content distributed from a Web server or provided by a medium in the client device 100. As shown in FIG. 2, the Web content 300 includes an HTML document 310 described in HTML, and style information 320 that represents the specifications concerning the method for displaying the HTML document 310.

The HTML document 310 is data formed by describing in HTML the logical structure and layout information of a document, which is open to the public on a Web site, the link relationship of the document to other data, and the like.

Although the Web content 300 in this embodiment is described in HTML, it can also be descried in XML, XHTML, or the like, for example. The style information 320 is, for example, setting information such as CSS (Cascading Style Sheets) that specifies the layout of a Web page. The CSS can specify, for example, the text color, text size, background color, or the like.

The Web content 300 in accordance with this embodiment also includes a Web content script 332 defined by a creator of the content. In the Web content script 332, a setting for a viewing environment, which is considered by a creator of the Web content 300 to be suitable for viewing the content, is defined using a script language such as a Java (Registered Trademark) script, for example. For example, if the Web content 300 includes a moving image with a strong light stimulus, the Web content script 332 has defined therein a setting for adjusting the lighting, sound, or the like of when the content is viewed in order to lessen the light stimulus or increase the realism of moving images. Other than the setting related to the viewing environment, it is also possible to change the way in which the content is displayed as intended by a creator of the content, by defining in the Web content script 332 the way in which the content should be displayed in accordance with the intention of the creator of the content.

The Web browser 130 that performs a rendering process to the aforementioned Web content 300 includes a rendering engine 132 adapted to analyze the Web content 300 and display it on the display device 112. Further, the Web browser 130 also includes a script language processing engine 134 adapted to determine the presentation state of the content in accordance with the viewing environment, and a protocol stack 136 adapted to perform a communication process between the Web browser 130 and software of external devices, for example.

The rendering engine 132 generates, on the basis of the style information 320 included in the Web content 300, rendering information to be displayed on the display device 112 from the information defined in the HTML document 310. That is, the rendering engine 132 functions as a content presentation unit that performs a process of presenting a content to a user.

The script language processing engine 134 processes a script described in a predetermined script language. The script language processing engine 134 in accordance with this embodiment processes a script on the basis of the viewing environment information acquired by the viewing environment information acquisition sensor 116 or the viewing environment information acquisition sensor 202 provided in an external device, and changes the setting information such as the style information 320. That is, the script language processing engine 134 functions as a setting information changing unit.

The script language processing engine 134 can process not only the aforementioned Web content script 332 included in the Web content 300 but also a user script 334 defined by a user who is a viewer of the content, for example. The user script 334 can have defined therein a content display method that matches the taste of the user, viewability, or the like. For example, if the user script 334 has defined therein a text size, sound volume, favorite color, or the like, that can be clearly recognized by a user, it is possible to present a content in a condition in which the user can clearly view the content.

The script language processing engine 134 can also process an embedded script 336 that has been defined in advance by the Web browser 130, the client device 110, or the like. In the embedded script 336, a default setting of the Web browser 130 is defined, for example. Accordingly, even when a content cannot be presented in a mode desired by a creator of the content or a user due to the restrictions on the performance of the Web browser 130 or the client device 100, for example, it is possible for the Web browser 130 or the client device 100 to present the content in a optimum condition.

The script language processing engine 134 can process not only the Web content script 332, the user script 334, and the embedded script 336 shown in FIG. 2, but also other scripts that define the presentation state of a content on the basis of the viewing environment information. Such scripts are adapted to present a content in an optimum viewing condition as with the Web content script 332. Thus, such scripts are also the presentation state changing information for changing the style information 320 in accordance with the viewing environment. Using such scripts can dynamically change the style information 320 such as CSS.

The script language processing engine 134, on the basis of the viewing environment information, analyzes each script, changes the style information 320, and displays a dialog or the like that prompts a change in the viewing environment. If the style information 320 is changed by the script language processing engine 134, rendering information created by the rendering engine 132 is also changed. In addition, if the script language processing engine 134 prompts a user to change the viewing environment, it is possible to set the current viewing environment to a viewing environment that is suitable for viewing the content before the user actually views the content.

Further, the script language processing engine 134 can send information about a change in the viewing environment to an external device, which is communicably connected to the client device 100, via the communication module 114. Accordingly, the external device, upon receiving the information about the change in the viewing environment, can automatically change the viewing environment. Alternatively, it is also possible to, in addition to sending the aforementioned information to the external device, ask a user if it is permitted to change the viewing environment, and if the user has permitted the change, automatically change the viewing environment with the external device. Note that the external device, to which information about a change in the viewing environment or the like is sent, may be an external device that has the viewing environment information acquisition sensor 202 or other devices.

The protocol stack 136 is a program module having a communication protocol suite for realizing communication of the client device 100. The protocol stack 136 performs a process of communicating with an external device that provides viewing environment information or with the Web server 400 that distributes the Web content 300.

In the client device 100 in accordance with this embodiment, the Web browser 130 performs a process of changing the presentation state of a content in accordance with the environment in which the content is to be viewed. As the Web browser 130 performs a process of rendering the Web content 300, it knows the details of the content to be displayed as well as the position of information to be displayed. Therefore, the Web browser 130 can finely change the contrast between the text and background as well as image correction or the like. Such a change can be effected by, for example, changing the setting of the style information 320 of the Web content 300. That is, although it has only been possible to uniformly change the whole screen with the conventional scheme, the client device 100 in accordance with this embodiment can finely change the presentation state of a content.

[Process of Changing the Style Information with the Script Language Processing Engine]

Figure 3:
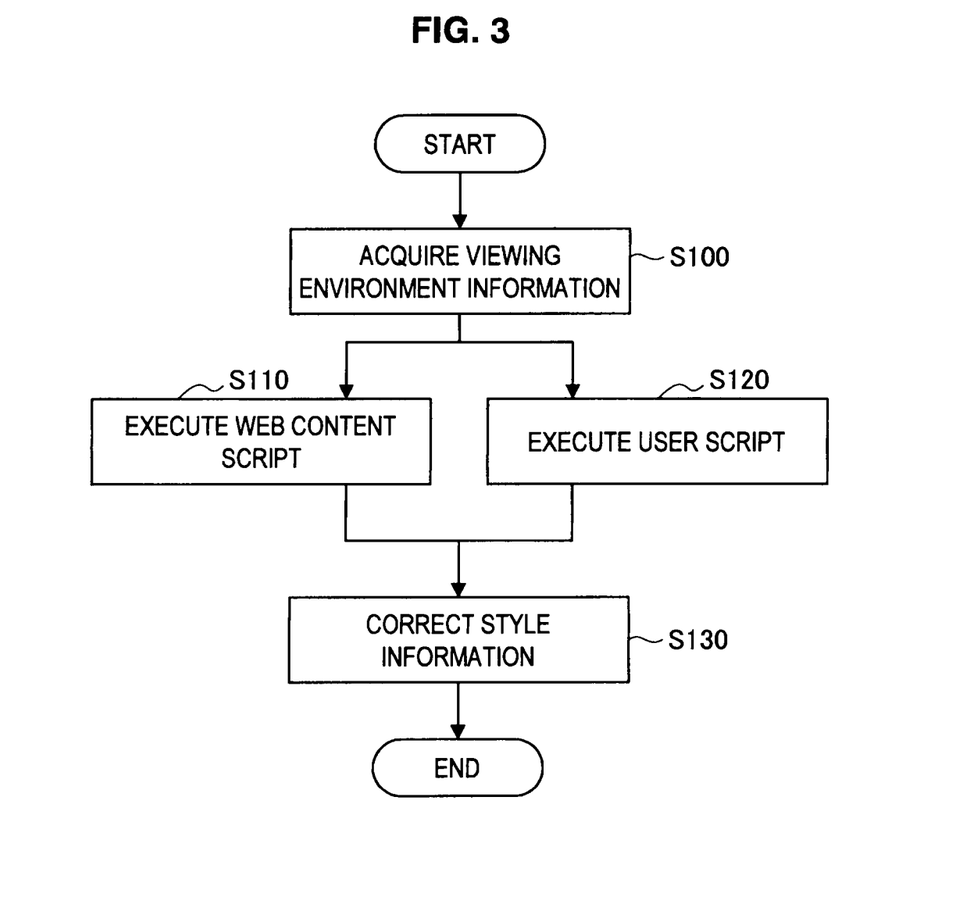
FIG. 3 is a flow chart showing an exemplary process of changing style information using a script language processing engine.

FIG. 3 shows an exemplary process of changing the style information 320 with the script language processing engine 134. First, as shown in FIG. 3, viewing environment information of the Web content 300 is acquired from the viewing environment information acquisition sensor 116 or from the viewing environment information acquisition sensor 202 of an external device that can communicate with the client device 100 via the communication module 114 (S100). The viewing environment information acquired from the viewing environment information acquisition sensor 116 (or 202) is output to the script language processing engine 134 of the Web browser 130.

The script language processing engine 134, upon receiving the viewing environment information, executes a script for changing the style information 320 (S110, S120). In this example, the Web content script 332 defined by a creator of the content and the user script 334 defined by a user who is a viewer of the content are set as the scripts. Herein, the script language processing engine 134 executes each script. Steps S110 and S120 can be executed either concurrently or sequentially.

A specific algorithm defined in each script depends on the intention of a creator of each script. For example, assume a case in which the text and background of the Web content 300 are corrected in accordance with the brightness of the viewing environment. If a numerical value indicating the brightness of the viewing environment is less than or equal to a predetermined value, the text color and background color are corrected to increase the contrast between the text and background of the style information 320 so that the viewability of the content is increased. Alternatively, if the numerical value indicating the brightness of the viewing environment is less than or equal to the predetermined value, it is considered that the viewing environment is dark and the text is difficult to see. Therefore, in such a case, the text size can be increased to increase the viewability of the content.

Further, if a color temperature correction filter, for example, is applied to the whole screen of the display device 112 or to an individual image in accordance with the color temperature of the viewing environment, a color temperature, which allows the content to be seen clearly, is defined in the script. When the style information 320 has defined therein a setting value different from the setting value of such a color temperature, the script language processing engine 134 changes the color temperature defined in the style information 320 to the color temperature defined in the script.

Upon termination of the execution of each script, the script language processing engine 134 corrects the style information 320 on the basis of the execution result of each script (S130). A specific algorithm for correcting the style information 320 also depends on the characteristics of the display device 112 and the intention of a creator of the Web content 300. Examples of the method for correcting the style information 320 include a correction method in which the style information 320 is changed on the basis of the execution result of only a single script, and a correction method in which the style information 320 is changed by combining the execution results of a plurality of scripts.

For example, it is possible to add the execution result of the Web content script 332 and the execution result of the user script 334 and average the sum so that the resultant average value can be used as the setting value for the style information 320 to be changed. Alternatively, it is also possible to weight the execution results of the scripts to the extent that the execution result of each script is reflected in the style information 320, and determine which of the intention of the content's creator and user should be reflected more in the style information 320 to be changed.

After the style information 320 is changed, the script language processing engine 134 informs the rendering engine 132 of the change in the style information 320. The rendering engine 132 generates rendering information of the Web content 300 to be displayed on the display device 112 from the corrected style information 320 and the HTML document 310, and outputs the rendering information to the display device 112. Through the process of changing the style information 320 with the script language processing engine 134 described above, it is possible to present the Web content 300 to the display device 112 in a condition suitable for the viewing environment.

Executing a script with the script language processing engine 134 not only allows correction of the style information 320 but also allows direct interaction with a user such as issuing a warning and prohibiting the viewing of the content. As the method for sending information to a user herein, the following is conceived, for example: displaying a dialog box on the display device 112 and emitting a sound with a speaker (not shown).

For example, if a content includes a moving image with a strong light stimulus, the following message can be issued: "Increase the Lighting Level to View the Content" to reduce health damage to the user (to reduce the light stimulus and prevent epilepsy). Meanwhile, if a content is a dark, horror movie, for example, the following message can be issued: "Lower Lighting Level is Recommended" to attain an advantageous effect of increasing the realism of moving images or the like. Further, if the surrounding noise level is high, the following message can be issued: "Increase the Sound Volume or Move to a Quiet Place," for example, to prompt a user to view the content in a non-interrupted environment.

In addition, it is also possible to send information about a change in the viewing environment to an external device via the communication module 114 by executing a script with the script language processing engine 134 so that the viewing environment can be automatically changed. For example, if information about the brightness or color temperature that is suitable for viewing the content is sent to a lighting fixture, which can communicate with the client device 100, it becomes possible to automatically change the brightness or color temperature of the lighting fixture. Alternatively, it is also possible to, in addition to sending the aforementioned information to the external device, ask a user if it is permitted to change the brightness or color temperature of the lighting fixture, and if the user has permitted the change, automatically change the brightness or color temperature with the lighting fixture to a level that is suitable for viewing the content.

Described above is the information processing system in accordance with the first embodiment. In this embodiment, the Web browser 130 of the client device 100 is adapted to execute a script, which reflects the intention of a creator of the content or a user, on the basis of the viewing environment information, and change the presentation state of the content so that the user can appropriately view the content. Accordingly, the viewability of the content can be increased. Further, it is also possible to achieve the advantageous effects that health damage to the user can be reduced and the realism of the content can be increased, for example.

Even if the client device 100 does not have the viewing environment information acquisition sensor 116 for acquiring the viewing environment information, this embodiment can be applied as long as the viewing environment information can be acquired from an external device that has the viewing environment information acquisition sensor 202. Thus, even the client device 100 without the viewing environment information acquisition sensor 116 can provide a user with a content that is suitable for his viewing environment.

<2. Second Embodiment>

Figure 4:
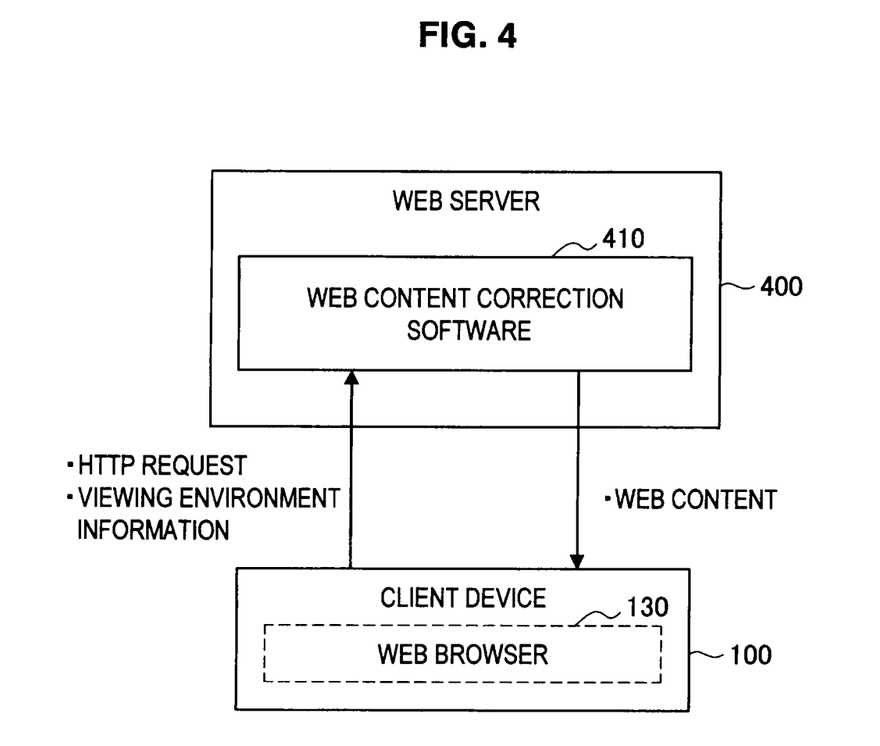
FIG. 4 is an explanatory diagram showing a process overview in accordance with a second embodiment of the present invention in which style information is corrected with a Web server.

Next, an information processing system in accordance with the second embodiment of the present invention will be described with reference to FIG. 4. FIG. 4 is an explanatory diagram showing a process overview in which the style information 320 is corrected with the Web server 400.

In the information processing system in accordance with this embodiment, the process of correcting the Web content 300 shown in FIG. 3 is performed by the Web server 400 that provides contents. Performing the correction process with the Web server 400 allows a reduction in the processing load on the client device 100. Accordingly, if the client device 100 is a battery-operated portable phone, for example, the power consumption of the battery can be reduced. Hereinafter, a process of correcting the style information 320 with the Web server 400 will be described. Note that detailed explanation of the structures and processes that are similar to those of the information processing system 100 in accordance with the first embodiments is omitted herein.

The information processing system in accordance with this embodiment can be configured in a similar way to the information processing system in accordance with the first embodiment. However, this embodiment differs from the first embodiment in that the Web server 400 has Web content correction software 410 adapted to correct the Web content 300.

The Web content correction software 410, in response to a content transmission request (an HTTP request) received from the client device 100 via a communication module (not shown), corrects the style information 320 of the Web content 300 on the basis of the viewing environment information. The viewing environment information used for correction of the Web content 300 is transmitted from the client device 100, together with the HTTP request. The Web content correction software 410 corrects the style information 320 of the Web content 300 through a similar process to the process performed by the script language processing engine 134 of the Web browser 130 in the client device 100 shown in FIG. 2.

Thereafter, the Web content correction software 410 transmits to the client device 100 a content whose style information has been changed in response to the transmission request. Note that the Web content correction software 410 can be described in any programming language that can operate on the server, and need not be described in the same language as the script language used in the client device 100.

As described above, correcting the Web content 300 with the Web server 400 allows the content to be distributed to each client device 100 while at the same time making the style information 320 reflect the intention of a creator or distributor of the content. The client device 100, upon receiving the Web content 300 with the changed style information 320, can display the content on the display device 112 in a condition suitable for a user's viewing environment, only by performing a rendering process to the Web content 300 with the rendering engine 132.

Note that the Web content 300, which has already been corrected with the Web content correction software 410, can be further corrected with the client device 100. The process of correcting the Web content 300 with the Web server 400 is typically considered to be performed on the basis of the Web content script 332 that is defined by a creator of the content.

Therefore, on the Web server 400, the Web content 300 whose style information 320 reflects the intention of the creator of the content is created through the execution of the Web content script 332.

The client device 100, upon receiving the Web content 300 that reflects the intention of the creator of the content, executes the user script 334 defined by a user who is a viewer of the content, so that the intention of the user is reflected in the style information. Accordingly, the Web content 300 that reflects the intention of the creator of the content and also suits the taste of the user can be presented. Herein, it is also possible to, if requested by the creator of the content, define unchangeable setting items among the setting items of the style information 320. In that case, it is possible to prevent the setting items, which should not be changed for the reason of reducing the health damage, for example, from being changed inadvertently.

Described above is the information processing system in accordance with the second embodiment. In this embodiment, the Web server 400 is provided with the Web content correction software 410 for changing the style information of a Web content, and after the style information 320 is changed with the Web server 400, the Web content 300 is distributed to the client device 100. Accordingly, when there is a content transmission request from the client device 100, the Web server 400 executes a script on the basis of the viewing environment information that has been transmitted together with the content transmission request, so that the style information 320 is changed such that it reflects the intention of a creator of the content or the like. Thus, as the client device 100 receives the Web content 300 with the style information 320 having been changed on the basis of the viewing environment information, it is possible to display the Web content 300 on the display device 112 in a condition suitable for the user's viewing environment, without the need to perform a special process.

<3. Exemplary Hardware Configuration>

Processes of the client device 100 in accordance with this embodiment can be executed either by hardware or software. In the former case, the client device 100 can be configured as a computer such as the one shown in FIG. 5. Hereinafter, an exemplary hardware configuration of the client device 100 in accordance with this embodiment will be described with reference to FIG. 5.

Figure 5:
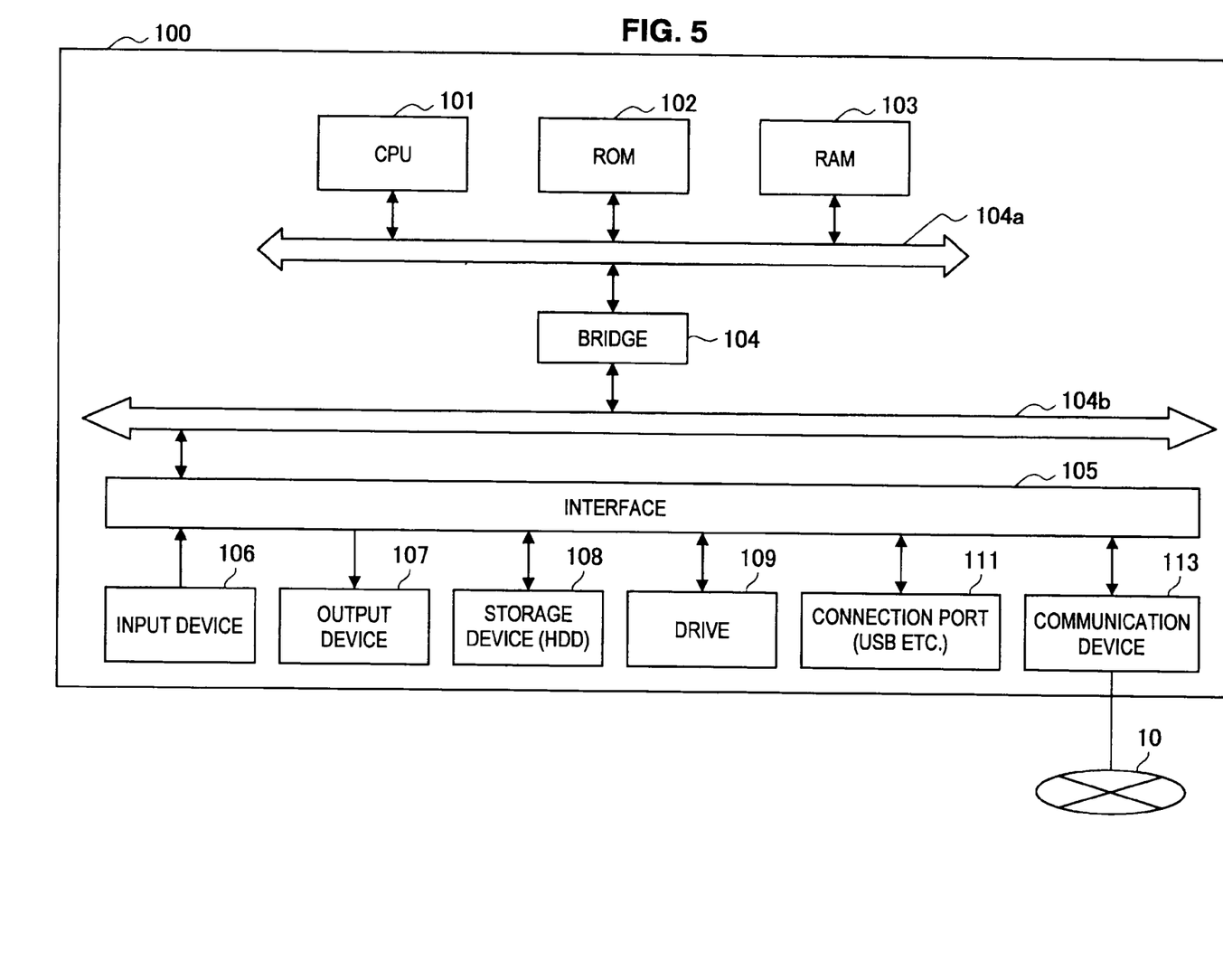
FIG. 5 is a block diagram showing an example of a hardware configuration of a client device.

The client device 100 in accordance with this embodiment can be implemented using a processor such as a computer. The client device 100 includes, as shown in FIG. 5, a CPU (Central Processing Unit) 101, ROM (Read Only Memory) 102, RAM (Random Access Memory) 103, and a host bus 104a. The client device 100 also includes a bridge 104, an external bus 104b, an interface 105, an input device 106, an output device 107, a storage device (HDD) 108, a drive 109, a connection port 111, and a communication device 113.

The CPU 101 functions as an arithmetic processing unit and a control unit, and controls the overall operation within the client device 100 in accordance with various programs. The ROM 102 stores programs, operation parameters, and the like that are used by the CPU 101. The RAM 103 temporarily stores programs used to execute the CPU 101, parameters that change as appropriate during the execution of the CPU 101, and the like. These components are mutually connected by the host bus 104a constructed from a CPU bus or the like.

The host bus 104a is connected to the external bus 104b such as a PCI (Peripheral Component Interconnect/Interface) bus via the bridge 104. Note that the host bus 104a, the bridge 104, and the external bus 104b need not be provided separately, and the functions of such components can be integrated into a single bus.

The input device 106 includes an input means for a user to input information, such as a mouse, keyboard, touch panel, button, microphone, switch, and lever; an input control circuit adapted to generate an input signal in response to a user's input and output the signal to the CPU 101, and the like. Examples of the output device 107 include a display device such as a liquid crystal display (LCD) device, an OLED (Organic Light Emitting Diode) device, or a lamp; and an audio output device such as a speaker.

The storage device 108 is an exemplary storage unit of the client device 100. This is a device for storing data. The storage device 108 may include a memory medium, a recording device for recording data on a memory medium, a reading device for reading data from a memory medium, an erasing device for erasing data recorded on the memory medium, and the like. The storage device 108 is, for example, an HDD (Hard Disk Drive). The storage device 108 stores programs and various data that drive the hard disk and are executed by the CPU 101.

The drive 109 is a reader/writer for a memory medium, and is incorporated in or externally attached to the client device 100. The drive 109 reads information recorded on a mounted removable recording medium such as a magnetic disk, an optical disc, a magneto-optical disk, or semiconductor memory, and outputs the information to the RAM 103.

The connection port 111 is an interface to be connected to an external device. This is a port to be connected to an external device that can transfer data via a USB (Universal Serial Bus), for example. The communication device 113 is a communication interface constructed from a communication device or the like to be connected to a communications network 10. The communication device 113 can be any of a wireless LAN (Local Area Network)-compatible communication device, a wireless USB-compatible communication device, and a wired communication device adapted to perform wired communication.

Although the preferred embodiments of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The present application contains subject matter related to that disclosed in Japanese Priority Patent Application JP 2010-124166 filed in the Japan Patent Office on May 31, 2010, the entire content of which is hereby incorporated by reference.

What is claimed is:

1. An information processing apparatus comprising:
 circuitry configured to
 change setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of different content is to be viewed, and present, on the basis of the setting information, the one of the plurality of different content to a user via a display device, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the circuitry is configured to change the setting information for the presentation state of the one of the plurality of different content based on a weighted average of the changes defined by the change criteria set by the creator and the user.

2. The information processing apparatus according to claim 1, wherein the corresponding one of the plurality of different presentation state changing information includes at least one of content changing information defined by the creator of the content, user's changing information defined by the user of the one of the plurality of different content, and embedded changing information defined in advance by the information processing apparatus, and wherein the circuitry changes the setting information using the corresponding one of the plurality of different presentation state changing information.

3. The information processing apparatus according to claim 1, wherein the corresponding one of the plurality of different presentation state changing information is a changing condition for correcting a color shade of the one of the plurality of different content to be presented on the display device in accordance with the environment in which the one of the plurality of different content is to be viewed, and wherein the circuitry, on the basis of the viewing environment information and the corresponding one of the plurality of different presentation state changing information, defines in the setting information a color shade of the one of the plurality of different content that is suitable for the environment in which the one of the plurality of different content is to be viewed.

4. The information processing apparatus according to claim 1, wherein the corresponding one of the plurality of different presentation state changing information is a changing condition for correcting a text size of the one of the plurality of different content to be presented on the display device in accordance with the environment in which the one of the plurality of different content is to be viewed, and wherein the circuitry, on the basis of the viewing environment information and the corresponding one of the plurality of different presentation state changing information, defines in the setting information a text size of the one of the plurality of different content that is suitable for the environment in which the one of the plurality of different content is to be viewed.

5. The information processing apparatus according to claim 1, wherein the corresponding one of the plurality of different presentation state changing information is a changing condition for changing the environment in which the one of the plurality of different content is to be viewed in accordance with the environment in which the content is to be viewed, and wherein the circuitry, on the basis of the viewing environment information and the corresponding one of the plurality of different presentation state changing information, sends information about a setting of the viewing environment that is suitable for viewing the one of the plurality of different content, to the user or an external device that is communicably connected to the information processing device.

6. The information processing apparatus according to claim 1, wherein the circuitry is further configured to acquire the viewing environment information.

7. The information processing apparatus according to claim 1, wherein the circuitry is further configured to communicate with an external device, the external device being communicably connected to the information processing apparatus and including circuitry configured to acquire the viewing environment information, wherein the circuitry of the information processing apparatus acquires the viewing environment information from the external device.

8. The information processing apparatus according to claim 1, wherein each of the plurality of different content is presented by a same application program executed by the information processing apparatus.

9. The information processing apparatus according to claim 1, wherein the circuitry is further configured to instruct an external device to alter the environment on the basis of the setting information.

10. The information processing apparatus according to claim 1, wherein the circuitry is configured to receive the one of the plurality different content and the corresponding one of the plurality of different presentation state changing information.

11. An information processing apparatus comprising:
circuitry configured to
communicate with a client device that presents content to a user via a display device,
store the content, and
change setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of content is to be viewed, wherein the circuitry, on the basis of the viewing environment information received from the client device, changes the setting information of the one of the plurality of different content requested to be distributed by the client device, wherein the one of the plurality of different content requested to be distributed and the changed setting information are transmitted to the client device via the circuitry, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the circuitry is configured to change the setting information for the presentation state of the one of the plurality of different content based on a weighted average of the changes defined by the change criteria set by the creator and the user.

12. An information processing method comprising the steps of:

changing, with circuitry of an information processing apparatus, setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of different content is to be viewed; and presenting, with the circuitry, the one of the plurality of different content to a user via a display device on the basis of the setting information, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the step of changing includes changing the setting information for the presentation state of the one of the plurality of different content based on a weighted average of the changes defined by the change criteria set by the creator and the user.

13. An information processing method comprising the steps of:

receiving, via circuitry of an information processing apparatus, a content distribution request and viewing environment information from a client device that presents content to a user via a display device;

changing, on the basis of the viewing environment information and one of a plurality of different presentation state changing information for changing a presentation state of one of a plurality of different content in accordance with the environment in which the one of the plurality of different content is to be viewed, setting information for setting a presentation state of the one of the plurality of different content requested to be distributed by the client device; and transmitting the one of the plurality of different content requested to be distributed and the changed setting information to the client device via the circuitry, wherein setting information for setting a presentation state for each of the plurality of different content is changed based on a different one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both an creator of the one of the plurality of different content and the user, and wherein the step of changing includes changing the setting information for the presentation state of the one of the plurality of different content based on a weighted average of the changes defined by the change criteria set by the creator and the user.

14. A non-transitory computer-readable medium storing a computer program which when executed by a computer causes the computer to:

change setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of different content is to be viewed; and present, on the basis of the setting information, the one of the plurality of different content to a user via a display device, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the setting information for the presentation state of the one of the plurality of different content is changed based on a weighted average of the changes defined by the change criteria set by the creator and the user.

15. A non-transitory computer-readable medium storing a computer program which when executed by a computer causes the computer to:

communicate with a client device that presents content to a user via a display device;

change setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of different content is to be viewed;

on the basis of the viewing environment information received from the client device, change the setting information of the one of the plurality of different content requested to be distributed by the client device; and transmit the one of the plurality of different content requested to be distributed and the changed setting information to the client device, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the setting information for the presentation state of the one of the plurality of different content is changed based on a weighted average of the changes defined by the change criteria set by the creator and the user.

16. An information processing system comprising:

a content distribution server connected over a network and adapted to distribute content; and a client device adapted to present the content to a user, wherein the content distribution server includes circuitry configured to
communicate with the client device,
store the content, and
change setting information for setting a presentation state of one of a plurality of different content on the basis of viewing environment information representing an environment in which the one of the plurality of different content is to be viewed and a corresponding one of a plurality of different presentation state changing information for changing the presentation state of the one of the plurality of different content in accordance with the environment in which the one of the plurality of different content is to be viewed, wherein the client device includes circuitry configured to communicate with the content distribution server, present, on the basis of the setting information, the one of the plurality of different content to the user via a display device, and transmit a content distribution request and the viewing environment information to the content distribution server, wherein the content distribution server changes, with the circuitry, the setting information for setting the presentation state of the one of the plurality of different content that has been requested to be distributed by the client device, on the basis of the viewing environment information and the corresponding one of the plurality of different presentation state changing information for changing the presentation state of the one of the plurality of different content in accordance with the environment in which the one of the plurality of different content is to be viewed, and then transmits the one of the plurality of different content requested to be distributed and the changed setting information to the client device, wherein the client device presents, with the circuitry, the one of the plurality of different content on the basis of the received setting information, wherein setting information for setting a presentation state for each of the plurality of different content is changed based on a different corresponding one of the plurality of different presentation state changing information, wherein each of the plurality of different presentation state changing information includes different criteria for changing a same characteristic of the plurality of different content, wherein the corresponding one of the plurality of different presentation state changing information includes change criteria set by both a creator of the one of the plurality of different content and the user, and wherein the content distribution server further changes, with the circuitry, the setting information for the presentation state of the one of the plurality of different content based on a weighted average of the changes defined by the change criteria set by the creator and the user.

* * * * *